April 12, 1927.

T. MIDGLEY 1,624,616

BEVELING AND SEALING CLAMP

Filed July 24, 1925

INVENTOR.
Thomas Midgley
BY Edward Naylor
ATTORNEY.

Patented Apr. 12, 1927.

1,624,616

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BEVELING AND SEALING CLAMP.

Application filed July 24, 1925. Serial No. 45,900.

This invention relates to clamps for beveling the ends of rubber tubes, and for sealing them to the mandrels upon which they are vulcanized. The present clamp is a modification of that described in my copending application Serial No. 45,899, filed July 24, 1925. The object of this modification is the accurate skiving and forming to length of the tube without the necessity of careful positioning of the clamp, a feature of considerable utility in some manufacturing methods.

Referring to the drawings.

Figure 4:
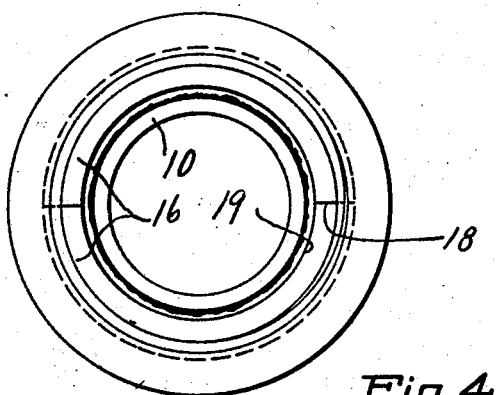
Fig. 4 is an end view showing the clamp fully applied.

In the present form of clamp the tube vulcanizing mandrel 10 carries at each end a skiving sleeve 11 permanently secured in place as by welding at 12, or by some other method. In any case, however, the sleeve preferably makes an airtight joint with the mandrel to avoid the entrance of steam underneath the rubber. These sleeves each have a portion 13 tapered to give the angle of skive desired on the tube, and a flat portion 14 which gives a stabilizing support to the other parts of the clamp. The tapered and flat portions preferably do not merge directly into each other, but are separated by a shoulder 15 which prevents the formation of a feather edge on the tube. The movable part of the clamp comprises split halves 16, threaded on a taper and as a unit upon their outer peripheries to receive an internally threaded ring 17. When the ring is screwed in place the two halves which separate along lines 18 as shown in Fig. 4, are held together to form a functionally integral unit having a smooth cylindrical bore 19.

Figure 1:
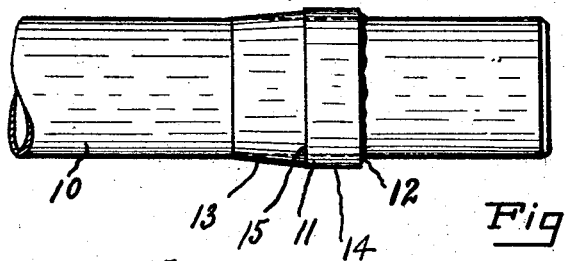
Fig. 1 is a view of the tube vulcanizing mandrel with the skiving sleeve permanently affixed to it.
Figure 2:
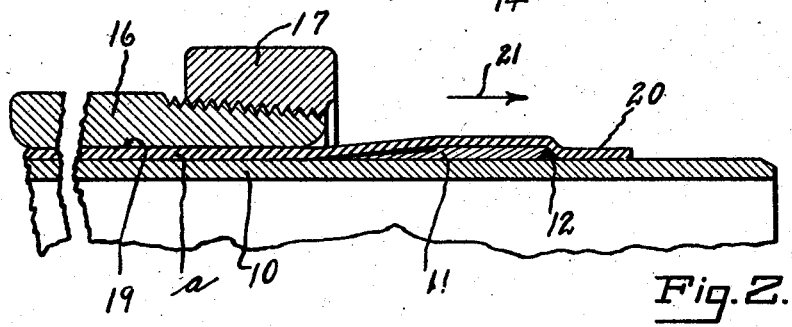
Fig. 2 is a section showing the clamp about to be applied.
Figure 3:
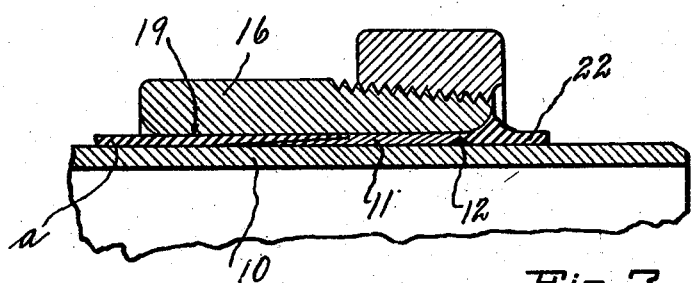
Fig. 3 is a similar section showing the clamp in place.

In use the unvulcanized tube a is placed upon the mandrel with its ends 20 extending over the fixed skiving sleeves 11 as in Fig. 2. The movable part of each of the two end clamps is assembled about the tube and mandrel at a point between the two skiving sleeves, also as shown in the case of one of them in Fig. 2. Finally, by exerting a considerable force in the direction of the arrow 21 the movable part of each clamp is drawn onto its skiving sleeve as in Fig. 3, pushing the excess rubber, which is in its uncured soft state, ahead of it. By this operation the end of the tube is at once skived and trimmed accurately to length, the distance between the shoulders 15 on the two clamps remaining the same and determining the length of the tube irrespective of any variation in placing the movable part of the clamps. The surplus rubber 22 at the ends of the tube has thus been sheared off, and can now be removed by simply pulling it. This, a feature present in common with the clamp shown in my copending application Serial No. 45,899, filed July 24, 1925, is of importance since scrap rubber is much more valuable uncured than cured. In disassembling the clamp it is convenient to unscrew the ring 18 enough to separate the halves 16 from the rubber, when the whole movable part of the clamp can be pulled off the end of the tube.

While the clamp as described is the preferred embodiment of the modification of my invention to which the present case relates, the details of construction may be varied as desired by the user or as dictated by circumstances, within the scope of the invention as set forth in the accompanying claims.

For example, certain of the advantages of this invention will be retained in some cases by replacing the clamp 16—17 with a spiral wrapping of tape such as has previously been used for sealing the end of the tube to the mandrel. By this modified method the tube will be cut to length by some other means, the sleeve 11, however, furnishing a gauge for this purpose. The skiving of the tube will be accomplished by the action of the tape against the skived part 13 of the sleeve 11.

Having thus described my invention, I claim:

1. In combination, a tube vulcanizing mandrel having a tapered skiving portion permanently located thereon, and a member having a substantially cylindrical bore adapted to be drawn over the skiving portion of the mandrel to press the tube tightly against it.

2. In combination, a tube vulcanizing mandrel having a tapered skiving portion terminating in a cylindrical surface of larger diameter than the diameter of the body of the mandrel, and a member having a cylindrical bore of substantially the same diameter as said cylindrical surface and adapted to be drawn over the skiving portion of the mandrel to press the tube tightly against it and to shear off the tube to length.

3. In combination, a tube vulcanizing mandrel having a tapered skiving portion terminating in a circumference larger than that of the body of the mandrel, and a member having a cylindrical bore of substantially the same diameter as said circumference and adapted to be drawn over the skiving portion of the mandrel to press the tube tightly against it and to shear the tube to length.

4. In combination, a tube vulcanizing mandrel, a tapered skiving sleeve located in a fluid tight manner thereon, and a member having a substantially cylindrical bore adapted to be drawn over said sleeve to skive and seal the tube.

THOMAS MIDGLEY.